United States Patent [19]

Kendall et al.

[11] Patent Number: 4,775,928
[45] Date of Patent: Oct. 4, 1988

[54] HAND-HELD WIRELESS COMPUTER CONTROLLER SYSTEM

[75] Inventors: Carroll D. Kendall; Lynn P. Kendall, both of Salina, Pa.

[73] Assignee: Westinghouse Electric Corp., Pittsburgh, Pa.

[21] Appl. No.: 793,060

[22] Filed: Oct. 30, 1985

[51] Int. Cl.⁴ ............................................. G06F 1/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,005,388 | 1/1977 | Morley et al. | 364/200 |
| 4,007,443 | 2/1977 | Bromberg et al. | 364/200 |
| 4,247,908 | 1/1981 | Lockhart, Jr. et al. | 364/900 |
| 4,354,252 | 10/1982 | Lamb et al. | 364/900 |
| 4,381,552 | 4/1983 | Nocilini et al. | 364/900 |
| 4,601,011 | 7/1986 | Grynberg | 364/900 |
| 4,617,554 | 10/1986 | Krause et al. | 340/365 R |
| 4,650,928 | 3/1987 | Numata | 379/62 |

OTHER PUBLICATIONS

"Mobile Radio Data Link", VR1130 brochure by Vectran Corporation, pp. 1-3.
"Low Cost Programmable Intelligent Terminal for Data Collection and Field Computing" for 42C brochure by G.R. Electronics, pp. 1-2.
"VR-10 Radio Control", brochure by Vectran Corporation, pp. 1-6.
"Pocket Terminal Type PT8 and PT12", brochure by G.R. Electronics, pp. 1-6.

Primary Examiner—Raulfe B. Zache

[57] ABSTRACT

A hand-held, battery powered, wireless control station transmits alphanumeric characters and control functions to a receiver interfaced with a host computer. The control station includes a microcomputer which converts keyboard signals into a secured character code and transmits the secured character code to a computer interface transceiver using a frequency shift key modulation technique. The keyboard is a multiple function keyboard having plural shift keys allowing several character codes for each key. The computer interface transceiver only recognizes or accepts secured character codes. For the character codes accepted the computer interface transceiver forwards the character to the host computer via an RS 232 interface link. The computer interface transceiver also transmits the secured character code back to the hand-held control station which then displays the characters on a display confirming for the operator receipt of the character by the computer end transceiver. In addition, messages which originate in the computer can be transmitted to the hand-held control station and displayed on the display therein in a secure manner.

15 Claims, 25 Drawing Sheets

HAND-HELD WIRELESS COMPUTER CONTROLLER SYSTEM

BACKGROUND OF THE INVENTION

1. Field of the Invention

The present invention is related to a hand-held wireless computer controller system which includes a hand-held terminal and a computer interface transceiver connectable to a computer. More particularly, the present invention is directed to a system which includes a compact battery powered wireless control station which securely transmits alphanumerics and control functions to a receiver which is interfaced to a computer via a RS 232 serial link. The receiver echoes back the transmitted information and the hand-held station displays the echoed back information on a display.

2. Description of the Related Art

Conventionally, communication with a computer is done by way of a hardware terminal which is bulky and not portable. The need for more lightweight and portable computer type terminals has resulted in the development of two types of portable terminals.

One is the type commonly associated with license checking systems used by the police. This system includes a host computer 10 communicating to a master terminal 12 through a multiplexor 14 to plural remote terminals 16–18. The remote terminals in this system are bulky, consume large amounts of power and would not be appropriate for a pocket sized terminal which could be used in a teaching environment in which the teacher would wander over a relatively confined area such as associated with a nuclear power plant simulator.

Another type of terminal is available in which a tethered hand-held terminal 20 is connected to a host computer 22 via a multi-pair cable 24. This system, even though it can provide a very compact terminal, suffers from the drawback of extremely limited range of movement because of the cable 24 which can be rather bulky and cumbersome to drag around. In addition, the attached cable 24 will not allow a teacher to comfortably stick the terminal 20 in a shirt or coat pocket. The more or functions or keys provided on the hand-held terminal 20, the larger and more bulky the cable 24 becomes.

A wireless hand-held terminal has also been developed which has only a transmit capability. The number of keys and, therefore, codes transmittable by the unit is also limited by the use of a pulse-width modulation transmission technique. The unit also does not include a display so the operator is always left guessing concerning whether the correct code has been transmitted to the host computer.

SUMMARY OF THE INVENTION

An object of the present invention is to provide an operator with a hand-held control station which allows a high degree of mobility and independence.

Another object of the present invention is to provide a portable, pocket-sized wireless control station.

An additional object of the present invention is to provide a secure terminal and computer connected receiver pair that will only communicate with each other.

A further object of the present invention is to provide a system that does not require an FCC license.

A still further object of the present invention is to provide a portable terminal with a large array of function keys and alphanumeric keys for the operation.

A still additional object of the present invention is to provide a system which indicates to the operator that messages have been received by the computer interface transceiver.

It is another object of the present invention to provide an operator with a multifunction hand-held terminal.

It is a further object of the present invention to provide a terminal useful in a teaching environment where the teacher is expected to move freely about a room.

An additional object of the present invention is to provide a system that indicates status allowing quick detection of a malfunction.

The above-mentioned objects are attained by a hand-held, battery powered, wireless control terminal which transmits alphanumeric characters and control functions to a computer end transceiver interfaced with a computer. The control station includes a microcomputer which converts keyboard signals into a character code, transmits a security code and character code to a computer interfaced transceiver. The microcomputer is interrupt driven and awaits interrupts in a low power consumption mode. The computer interface transceiver only recognizes or accepts character codes following the security code. For the character codes accepted the computer interface transceiver forwards the character to a computer via an RS 232 interface link. The computer interface transceiver then transmits the security code and character code back to the hand-held control station which then displays the characters on a low power consumption liquid crystal display. In addition, messages which originate from the computer can be transmitted to the hand-held control station and displayed on the display therein.

These together with other objects and advantages which will be subsequently apparent, reside in the details of construction and operation as more full hereinafter described and claimed, reference being had to the accompanying drawings forming a part hereof, wherein like numerals refer to like parts throughout.

DESCRIPTION OF THE PREFERRED EMBODIMENTS

Figure 1:
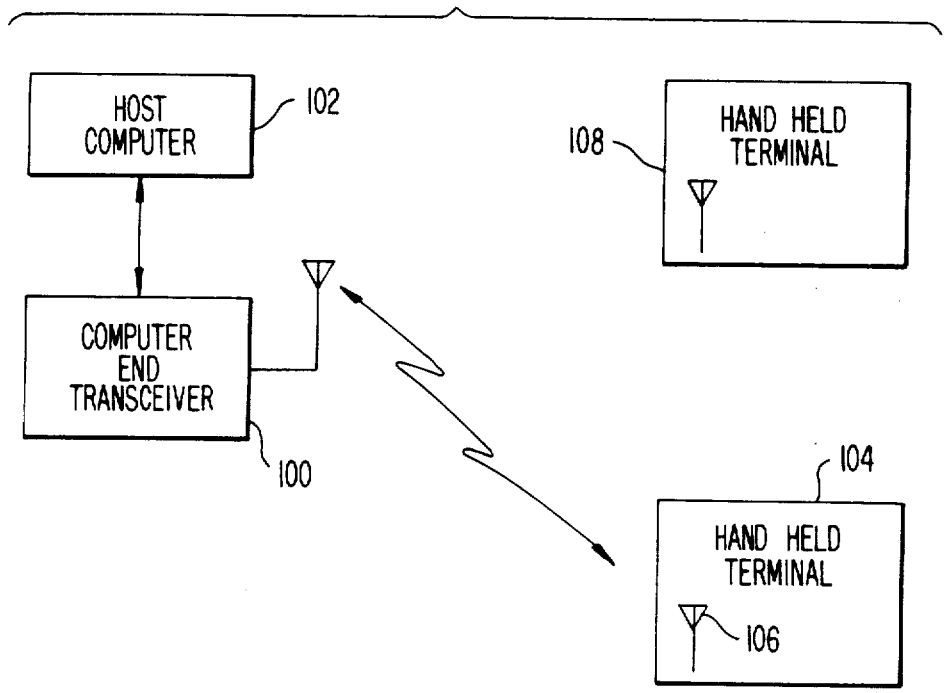
FIG. 1 illustrates the major components of the present invention.

The present invention includes a computer end transceiver 100 coupled to a host computer 102 and communicating with a hand-held terminal 104 including an internal antenna as illustrated in FIG. 1. Because the messages is between the computer end transceiver 100 and hand-held terminal 104 include a security code, only communications between this pair are possible and a different hand-held terminal 108 with a different security code will be unable to communicate with the transceiver 100.

Figure 2:
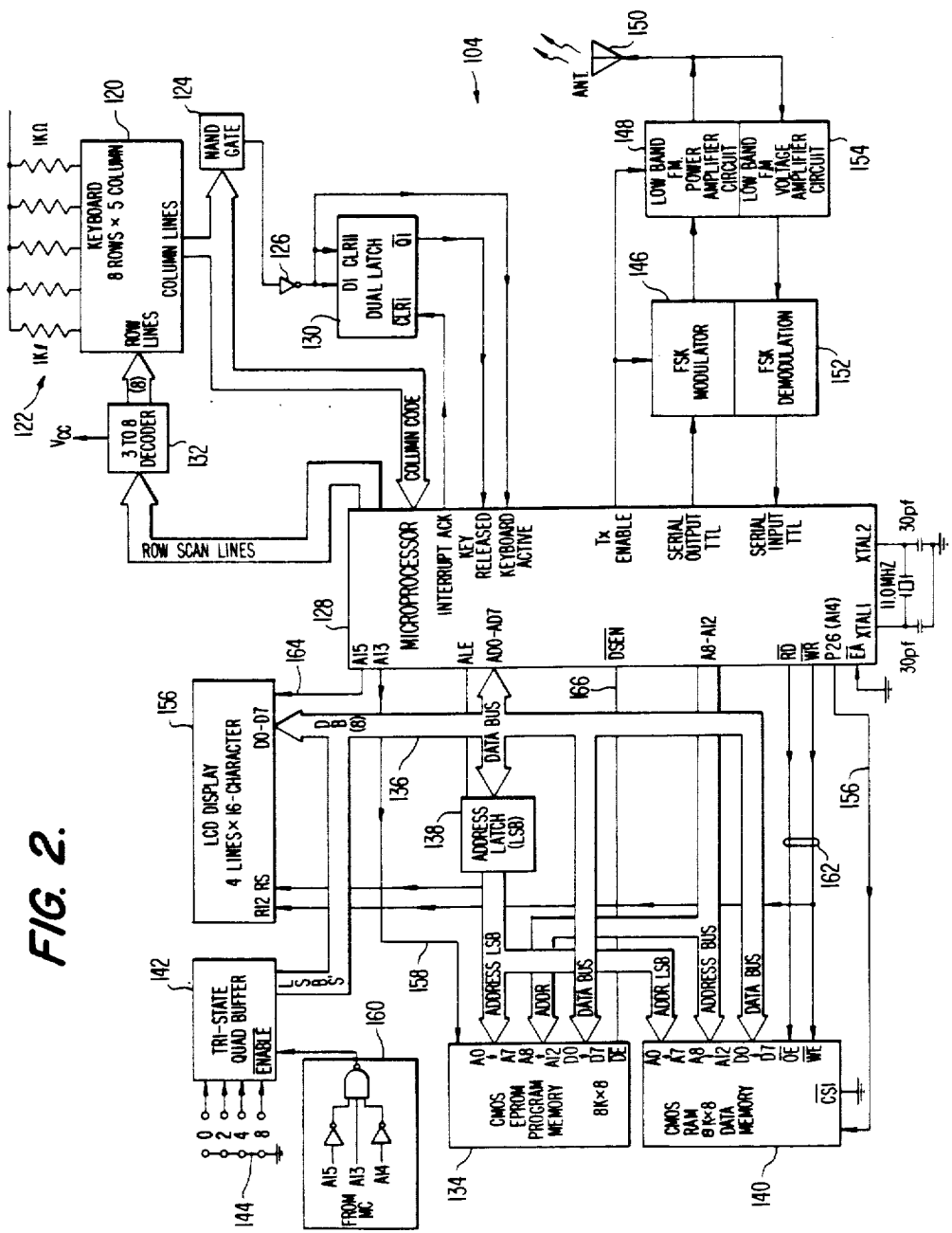
FIG. 2 is a detailed circuit block diagram of the components of the hand-held control station of the present invention.

The hand-held terminal, as illustrated in FIG. 2, includes an eight row by five column keyboard 120 with pull-up resistors 122 attached to the column line. When a key is depressed a zero will be output on one of the column lines causing a NAND gate 124, such as a 74HC10 by Texas Instruments and NOT circuit 126, such as a 74HC04 by Texas Instruments to produce a keyboard active or key depressed interrupt signal which has a low value. A microprocessor 128 is interrupted by the key depression signal and changes from an inactive low power to an active full power full function mode. A CMOS microprocessor such as a 80C31 by Intel is preferred. The microprocessor 128 acknowledges the key depression signal by clearing a dual positive edge triggered latch 130 such as a 74HC74 by Texas Instruments and outputting a keyboard scan signal to a 3 to 8 decoder 132 such as a 74HC138 by Texas Instruments. The scan signal, which is changed the microprocessor for each row, causes the row lines of the keyboard 120 to be activated one row at a time so that the microprocessor 128 can determine which row includes the depressed key. The row and column code for the depressed key are used to determine which key has been depressed. The key release signal is generated when the output of the NAND gate 124 goes low. After saving the column and row codes, the microprocessor 128 awaits a latched key release signal from the latch 130 before beginning character processing and clearing the key release signal from the latch 130. The microprocessor 128 uses the row and column codes to retrieve an ASCII character code from a ROM 134 such as a low power CMOS EPROM 27C64-2 by Intel over a common data and address bus 136 and through an address latch 138 such as a 74HC373 by Texas Instruments. The preferred microprocessor 128 uses a common bus 136 so that the size of the chip package and number of pin terminals can be kept to a minimum. The use of a common bus 136 also allows a smaller device due to the need for less space required for bus wiring lines. If the codes are for a shift key, the microprocessor 128 awaits additional keyboard signals if a shift key has not been depressed, it begins the process of transmitting the character to the computer end transceiver 100. If the retrieved character code is to be sent directly to the computer end transceiver 100, it is temporarily stored in a transmit buffer in a RAM 140 such as an HM6264-LP-18 by Hitachi. The preferred RAM includes a low power consumption stand by mode which can be activated by microprocessor 128. A four bit security code is retrieved from a tri-state quad buffer 142, such as a 74HC125 by Texas Instruments, loaded by security code micro switches or jumper pins 144. The security code passed by the processor 128 to a frequency shift keying modulator 146, such as an EXAR XR210 by Exar Corp., followed by the character code stored in the transmit buffer. When the frequency shift key modulator 146 is enabled, parity codes and leading and trailing bits are added to the message to be sent and input as a modulated radio frequency signal to a low band frequency modulation power amplifier circuit 148 which transmits the message over an internal antenna 150. The circuit details for the amplifier 148 can be provided by a person or ordinary skill in the art. The internal antenna does not interfere with putting the terminal 104 in a shirt pocket.

When a returned security code and character code echo from the computer end transceiver 100 are received by a frequency shift key demodulation circuit 152, such as an EXAR XR210 by Exar Corp., via the antenna 150 and a low band FM voltage amplifier circuit 154, the details of which can be supplied by one of ordinary skill in the art, the demodulation circuit 152 transfers the echoed security code and character code serially to the processor 128. The processor 128 then outputs the character code to the appropriate position in a four line by sixteen character low power consumption liquid crystal display 156, such as a DMC16433 by Optrex, if the security code is correct. The display 156 is a command driven display allowing powerful cursor movements with simple commands. The display incudes a display buffer and recognized an ASCII character code.

The character display after the echo back occurs whenever the processor 128 is operating in a line mode. When the processor 128 is changed to the local mode by depression of one of the keys on the keyboard 120, any character code produced after accessing ROM 134 is displayed directly on the display 156. The various circuits in the microprocessor have standby modes in which substantially less power is consumed. These circuits are changed from the standby to the active modes over standby control lines or through an enable circuit 156 which allows the individual circuits to be turned on or enabled as addressed. Because of the low power consumption and the use of compact circuit elements requiring very few wiring lines, the hand-held terminal of FIG. 2 can be arranged in a pocket-sized terminal approximately 6 inches by 3 inches by 1½ inches including a changeable battery.

Figure 3:
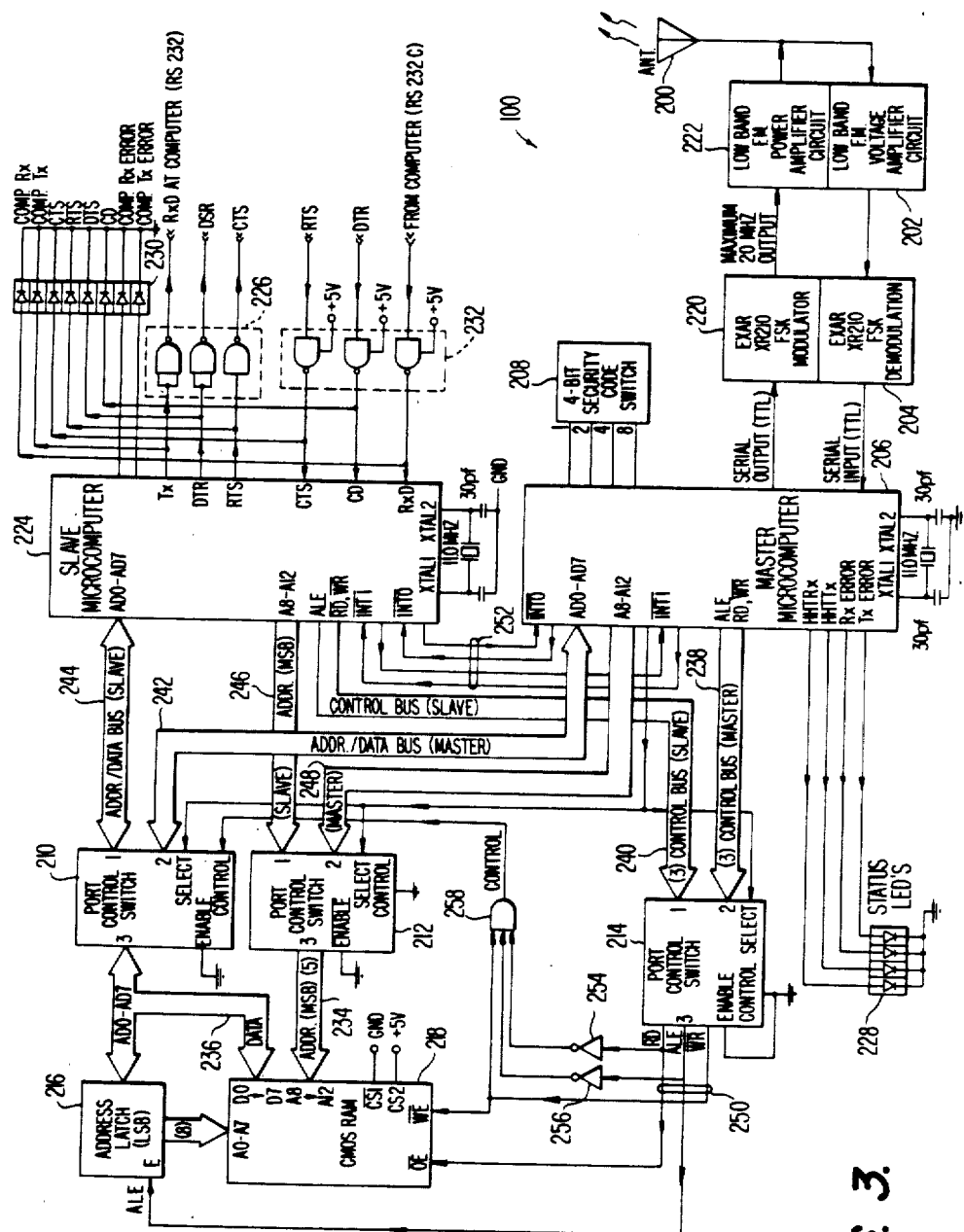
FIG. 3 is a block diagram of a compute interface transceiver according to the present invention.

When a security code followed by a character code both including parity, trailer and header bits is received by the antenna 200 of the computer end transceiver 100 of FIG. 3, the message is passed through a low band FM voltage amplifier circuit 202, the details of which can be supplied by one of ordinary skill in the art, and demodulated by a frequency shift keying demodulation circuit 204 such as an EXAR 210 by Exar Corp. The message is then serially applied to a master microcomputer 206 such as an 8751H by Intel. The microcomputer includes an internal EPROM for holding a control program. The master computer 206 checks the message security code against a security code produced by security code switches or jumper pins 208 and, if the codes match, the master computer 206 through bus control port switches 210–214, such as three MC6881 by Motorola, and address latch 216, such as a 74373 by Texas Instruments, stores the later received character code in a RAM 218, such as an HM6264LP-10 by Hitachi. After the character code has been stored in RAM 218 it, along with the security code are echoed back to the hand-held unit through an FSK modulator 220, such as an EXAR XR210 by Exar Corp. and low band FM power amplifier circuit 222, the details of which can be provided by one of ordinary skill in the art. Once the echo back has occurred, the master computer 206 transfers control of the address bus and the data bus for the RAM 218 to a slave microcomputer 224 through interrupt hand shaking signals. The slave computer 224 retrieves the character code from RAM 218 and transmits it to the host computer 102 over interface circuit 226 via an RS232C asynchronous full duplex controller. The RS232C controller is an off the shelf interface board such as the SEL/Gould 8-line asynchronous controller and can be provided by one of ordinary skill in the art. During the communications process, status LED's 228 and 230, such as 4-265 Series by General Instruments, periodically flicker providing an indication that proper communication is occurring or a quick indicator of a malfunction. The full duplex transmission line can carry a message from the host computer 102 to the slave computer 224 through interface circuit 232. The slave computer 224 stores the message in RAM 218 which is retrieved by master 206 and sent to the hand-held unit 104. The hand-held unit 104 receives the message including the security code, stores the message in a receive buffer in RAM 140 and then displays the message on display 156.

Figure 4A:
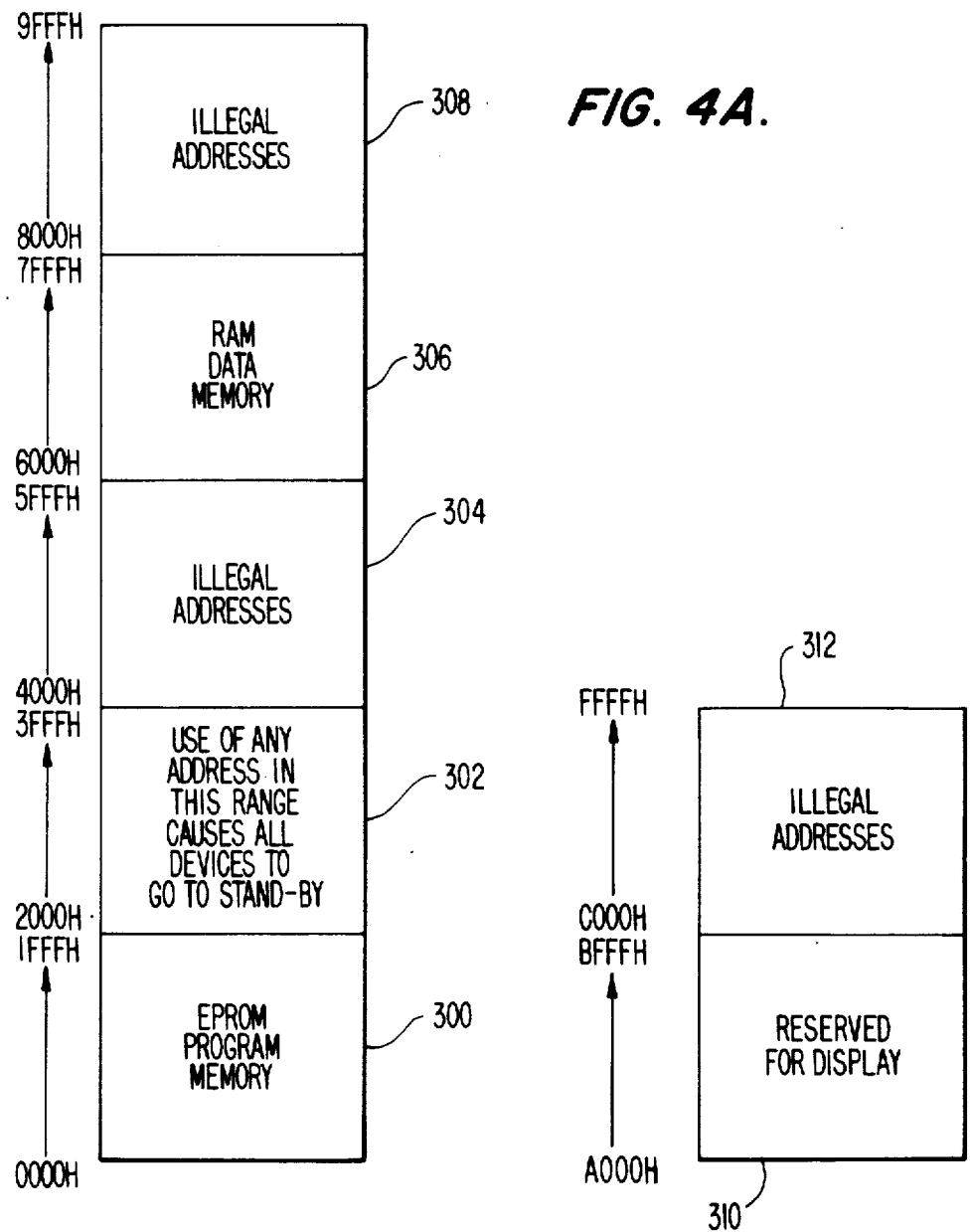
FIGS. 4A and 4B depict a memory map for a microcomputer in FIG. 3.
Figure 4B:
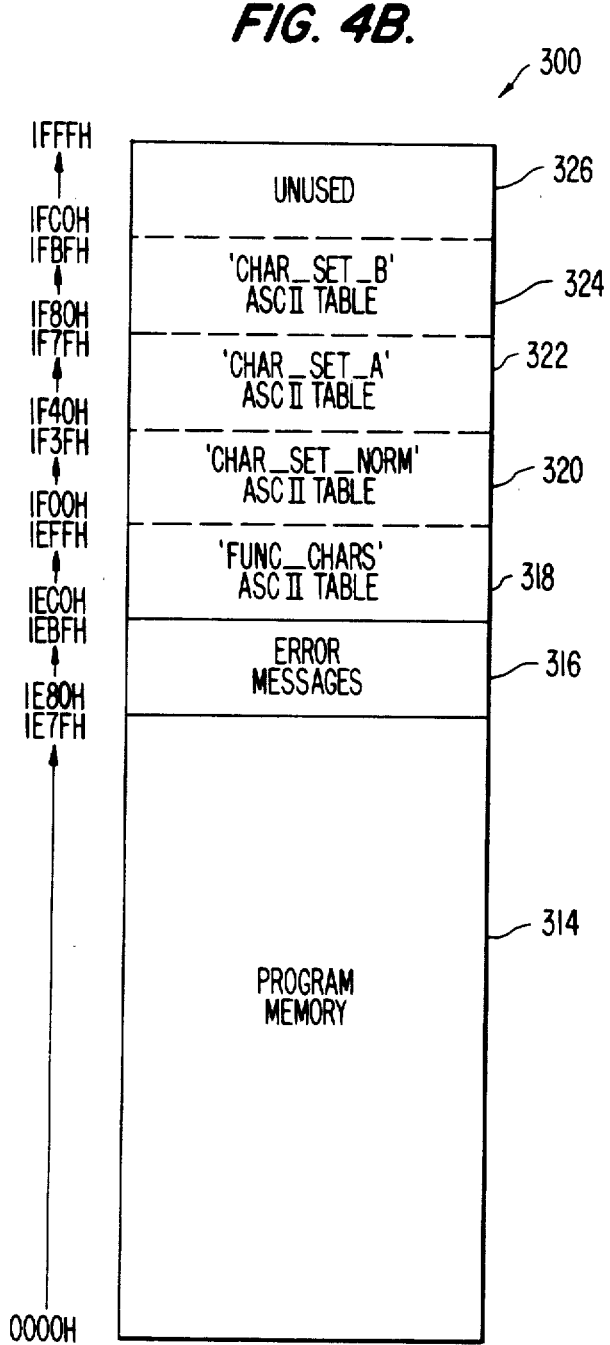

FIG. 4A illustrates the memory map for the RAM 140 and ROM 134 in the preferred embodiment of the hand-held unit. The illegal addresses are necessary because of the common data and address bus 138 used by the microprocessor 128 to prevent activation of multiple devices. FIG. 4B illustrates in more detail the memory map of the ROM 134 including the transformation tables for each character set.

Figure 5:
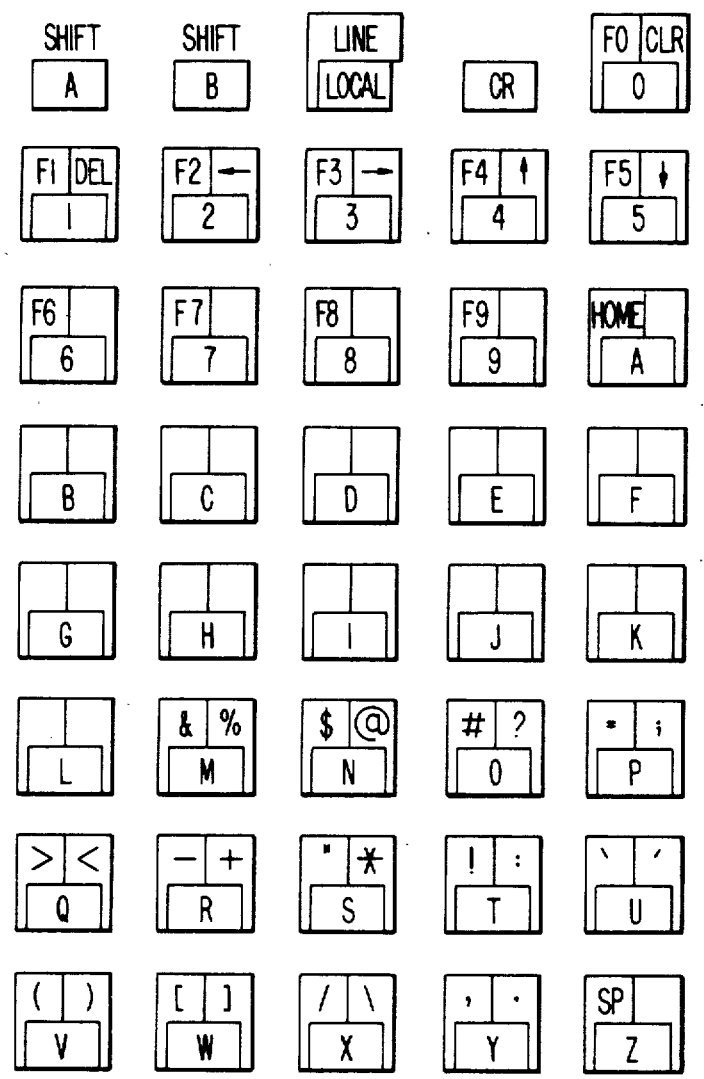
FIG. 5 depicts an arrangement of keys in the terminal of the present invention.

FIG. 5 provides an example of a suitable keyboard arrangement and a preferred key assignment including two shift keys and ten function keys. From the key assignment an appropriate key code character code translation table can be created. Appropriate row and column lines are provided in the keyboard for indicating which key has been depressed.

In the following discussion and in the flowcharts of FIGS. 6A–6D, several interrupt routines are executed which make subroutine calls to various subroutines within the system. Each of the subroutine calls performs standard register and program status word save operations which save the state of a processor on a push down stack. The returns from a subroutine call also perform standard state restoration actions.

Figure 6A:
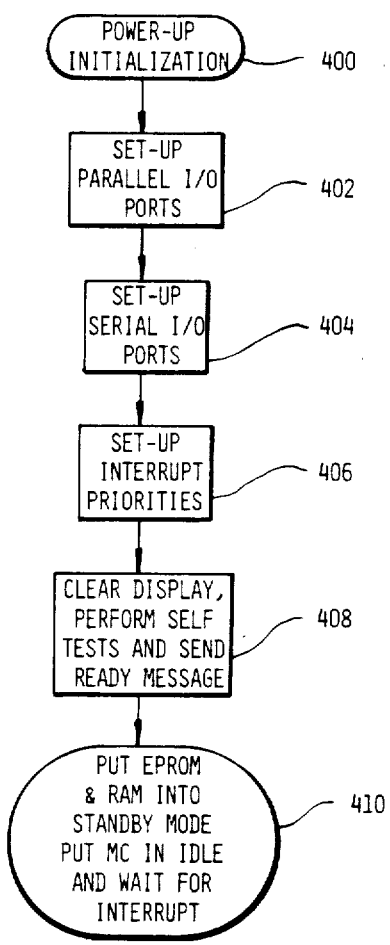
FIG. 6A–6R are flowcharts of the program for the microprocessor 128 in the hand-held control station of the present invention.

When the hand-held terminal is powered up, it automatically resets itself 400 and initializes various portions of the terminal as illustrated in FIG. 6A. The microprocessor 128 retrieves the input and output port configuration from ROM 134 and sets up all parallel input/output (I/O) 402 and serial I/O ports 400 and 404. During this initialization, the levels of each input are set as well as the baud rate of the data and how many bits are to be sent in each word are initialized. Next, the processor 128 retrieves interrupt priority schedule from the ROM 134 and sets the interrupt priority scheme for the processor. The preferred schedule from highest to lowest priority is: message from the computer end transceiver, key release interrupt and key depression interrupt. After the interrupt schedule is completed, the display 156 is cleared 408 and a ready message is output to the display, indicating to the operator that the system is properly working. At this time, any internal tests of memory, I/O ports, keyboard, etc., are performed and the operator is informed if a malfunction has occurred. The last step of the power up initialization routine places the ROM 134, RAM 140 and buffer 142 into the standby low power mode and places the microprocessor 128 in the low power idle mode awaiting an interrupt. In this state, maximum power conservation is achieved with the microcomputer consuming only a small portion of its normal sixteen milliamps. During the idle mode, the microcomputer is awaiting an interrupt which will bring the microprocessor 128 back to full function operation and fully activate the ROM 134, RAM 149 and buffer 142. Any activity on the keyboard or from the serial input ports will cause an interrupt which will activate the microcomputer.

Figure 6B:
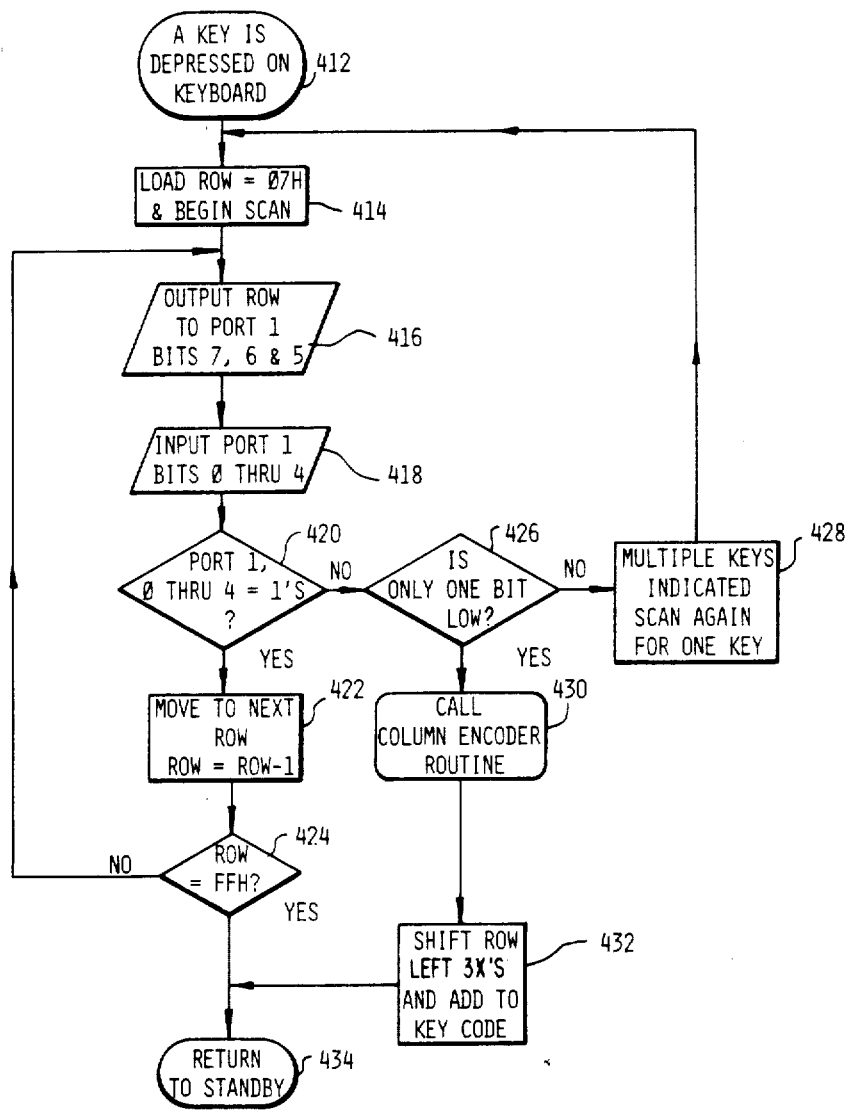

When a key on the keyboard 120 is depressed 412, an interrupt occurs which begins the keyboard interrupt service routine of FIG. 6B that scans the keyboard to determine which key has been depressed. First, the microprocessor initializes the row scan variable 414 and then outputs 416 the row value to the row decoder 132. Next, the input port is sampled 418 and if the input is not all "1"s, 420 indicating that a key on that row has been depressed, then the row pointer is decremented 422. If the row pointer is pointing to a non-existent row 424, that is, if the pointer has moved passed the lowest row on the keyboard the scan routine stops. If the row indicator is still pointing to a valid row, the scan operation continues until at least one of the bits on the input port is a zero. If more than one bit is zero 426, it indicates multiple keys 428 and the scan is restarted. If only one of the input port bits is zero, the correct row has been found, and the column encoder subroutine is called 430. After the column encoder subroutine returns a space saving three-bit code equivalent to the five bit column code allowing reduced memory space for a character table. The row number is then shifted to the left by three places and the column number is added to the to create a composite key code 432. Once the key code is produced, the microprocessor awaits an interrupt 434 in the low power state.

Figure 6C:
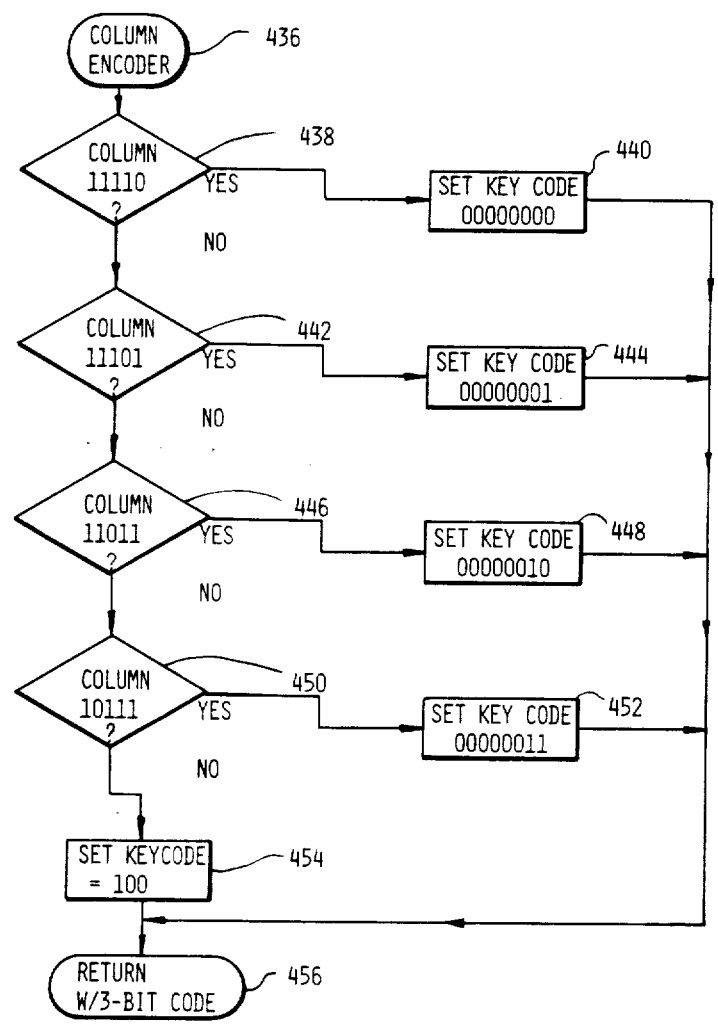

FIG. 6C illustrates the column encoder subroutine which merely determines which column code has been produced and returns a key code which can be added to the row code. The compaction of the column code and row into a six bit key code allows the key code conversion table stored in ROM 134 to be very compact.

Figure 6D:
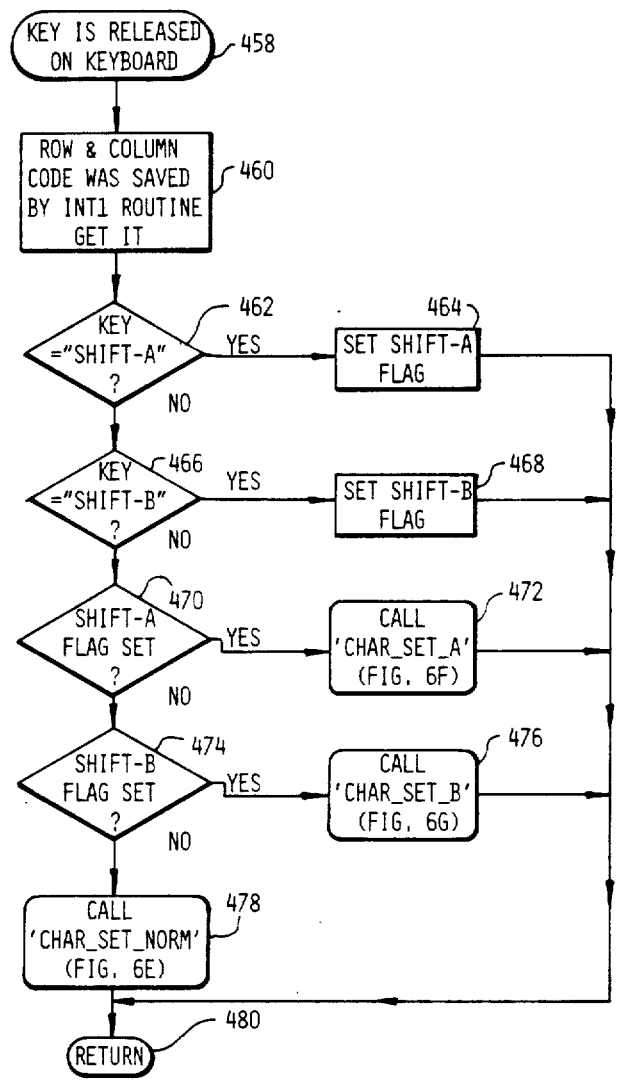

When a key is depressed on the keyboard 120, the encoding routine as discussed above outputs the key code for the depressed key, however, the microcomputer must await the releasing of the key before key code conversion can continue. FIG. 6D illustrates the key release interrupt routine which acts a debounce routine and also starts key code processing. When the key interrupt occurs 458, the saved row and column key code is retrieved and a determination is made concerning whether the key code is one of the shift keys 462 and 466 which will set the particular shift key flags 464 and 465. If a shift key flag has already been set 470 and 474, subroutines for encoding the character set associated with the previously-depressed shift key are called 472 and 476 otherwise a unshifted character encoding routine is called 478. After the codes have been completely processed, the microcomputer awaits an interrupt 480.

Figure 6E:
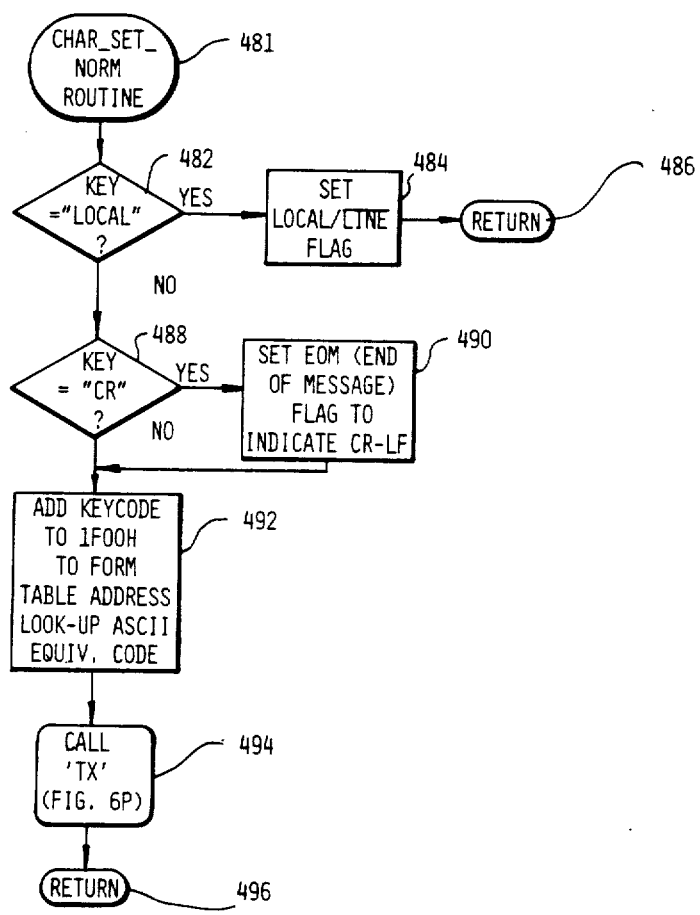

When the character set routine of FIG. 6E for unshifted or normal keys is called, the microprocessor determines whether the key is the local key 482 and sets the local/line flag to local 484 and returns 486. If the key is a arriage return key 488, then the end of message flag is set 490. When the key is not a local or a carriage return key, a table look-up address is created, the address is used to retrieve the ASCII character code and the transmit routine is called 494 to transmit the character code.

Figure 6F:
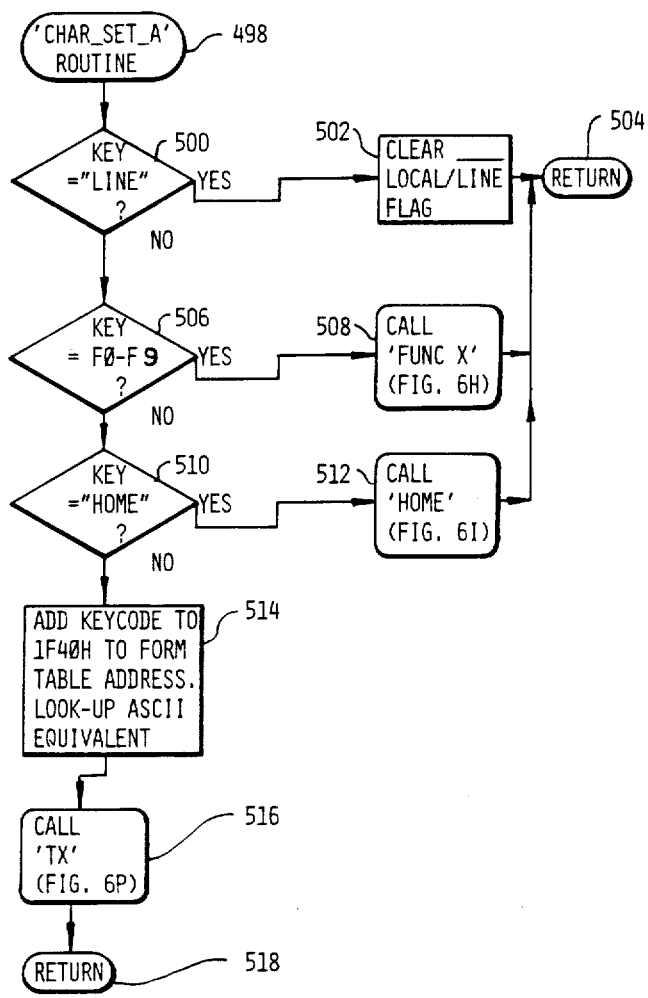
Figure 6G:
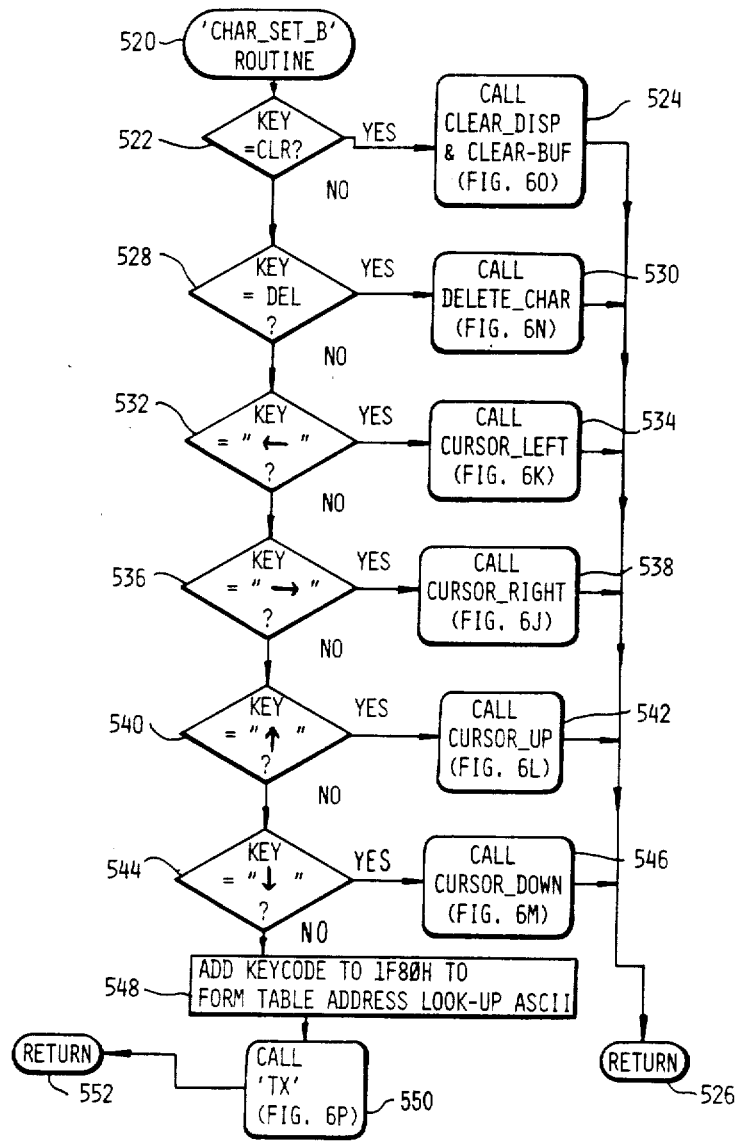

The routine of FIG. 6F which processes the key code after a shift A has occurred also determines whether the key code is the line key 500 and sets the appropriate flag 502. If the key code is a function key 506 or the home key 510 which moves the cursor to the beginning of the display, then appropriate routines 508 and 512 are called. Otherwise, once again, a table look-up address is formed, the appropriate character code is retrieved 514 and the transmit routine is called 516. The character set routine when a shift B has occurred is set forth in FIG. 6G. This routine is similar to the previous routines except this routine can detect other keys 522, 528, 532, 536, 540 and 544 and call subroutines 524, 530, 534, 538, 542 and 546 which move the cursor around on the display 156 or translate the key code into a character code 548 followed by a transmit 550.

Figure 6H:
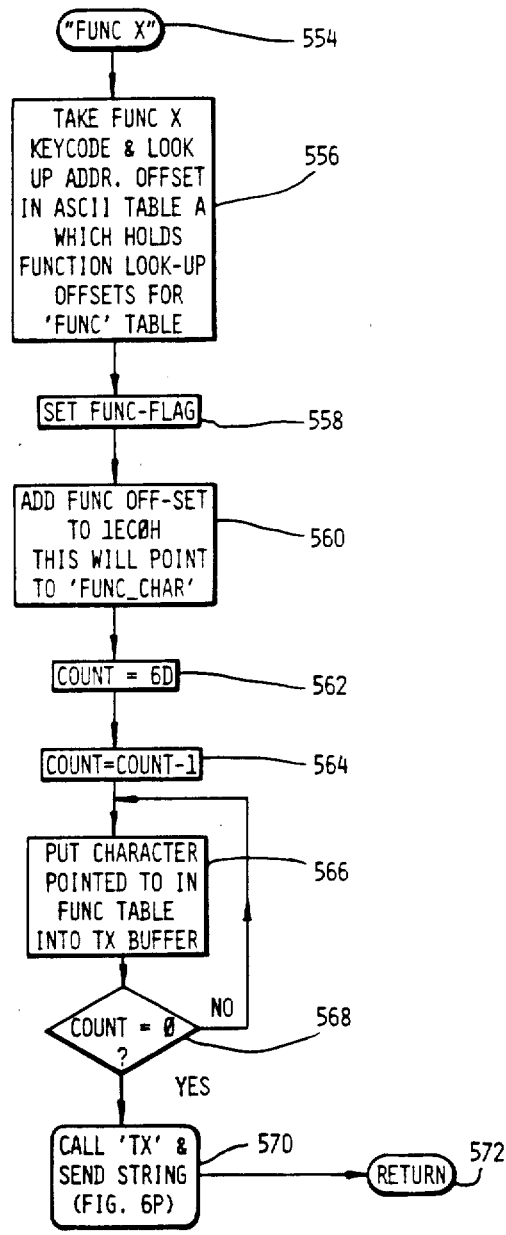

FIG. 6H represents the format of a function routine where substantially identical function routines would be provided for each of the function keys F0-F9. That is, the "X" in the routine stands for a function number which corresponds to a predetermined message to be sent to the host computer 102. In the function routine, the function key code is used to obtain an address offset 556 stored in a table in ROM 134 after which the function flag is set 558. The function offset is added to a constant to create a pointer to the character string which represents the function message. A character count is initialized 562 and the character string is loaded into the transmit buffer one character at a time 564-568 and then the transmit routine is called 570. In this example, a message of 6 characters is to be sent, however, the actual message length is flexible and determined by the string count.

Figure 6I:
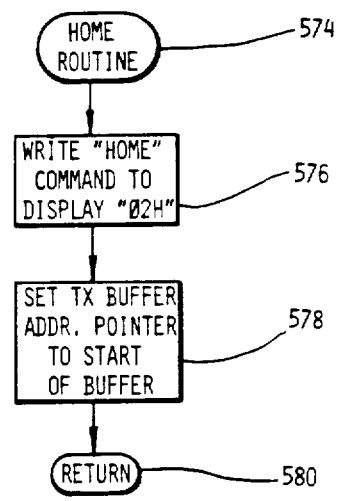

The home subroutine of FIG. 6I sends 576 a home command to the display 156 which automatically moves the cursor to the home position. The subroutine then resets 578 the transmit buffer pointer to the beginning of the buffer.

Figure 6J:
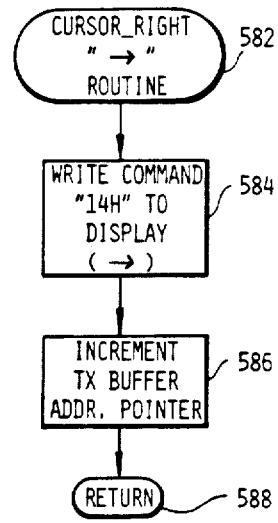

The cursor right subroutine of FIG. 6J sends 584 a command to the display 156 which moves the cursor to the right one space then the routine increments 586 the transmit buffer pointer. The cursor left subroutine of FIG. 6K also sends 592 a command to the display 156, however, this command moves the cursor to the left one space. The cursor left subroutine then decrements 594 the transmit buffer address pointer.

Figure 6K:
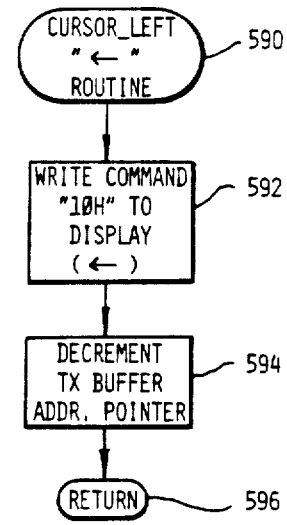
Figure 6L:
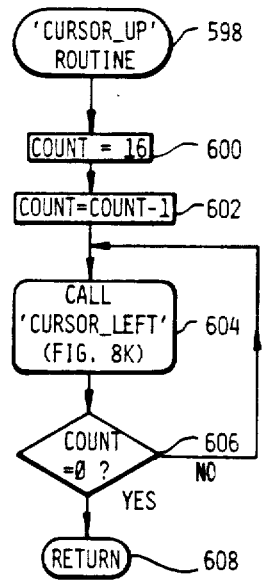
Figure 6M:
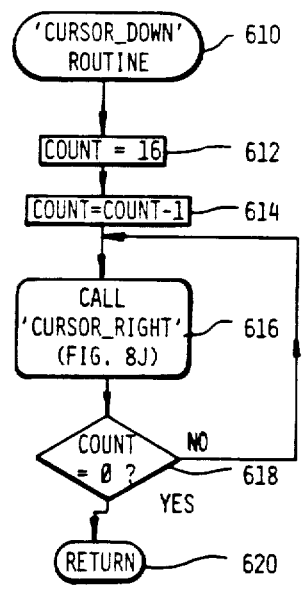

The cursor up subroutine of FIG. 6L, since it must also take care of moving the transmit buffer pointer backwards in the transmit buffer has embedded therein a call 604 to the cursor left subroutine of FIG. 6K. During the cursor up subroutine the cursor is actually moved left until it reaches the identical spot in the next line up using a line count to loop on the cursor left routine. The cursor down subroutine of FIG. 6M functions in the same manner while looping to call the cursor right subroutine of FIG. 6J.

Figure 6N:
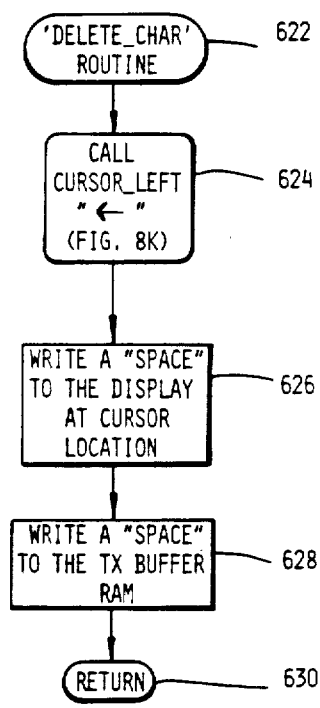
Figure 6O:
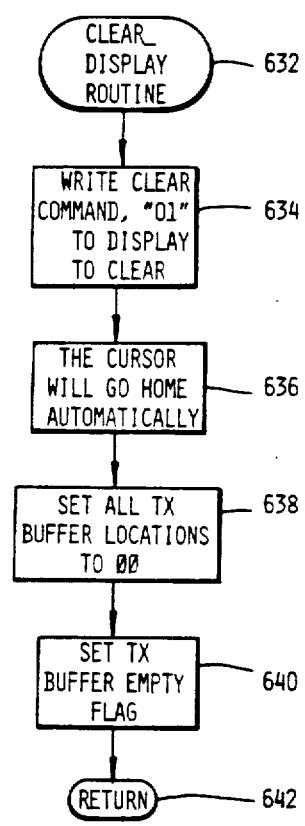

Whenever the key code indicates a delete character has been depressed, the cursor left subroutine is called 624 during the character delete subroutine of FIG. 6N and a space is written 626 and 628 into the display at the previous cursor location and at the appropriate location in the transmit buffer.

The clear display subroutine sends 634 a clear command to the display which clears the display and automatically homes 636 the cursor. In addition, the transmit buffer is loaded 638 with null characters and the transmit buffer flag is set 640 to empty.

Figure 6P:
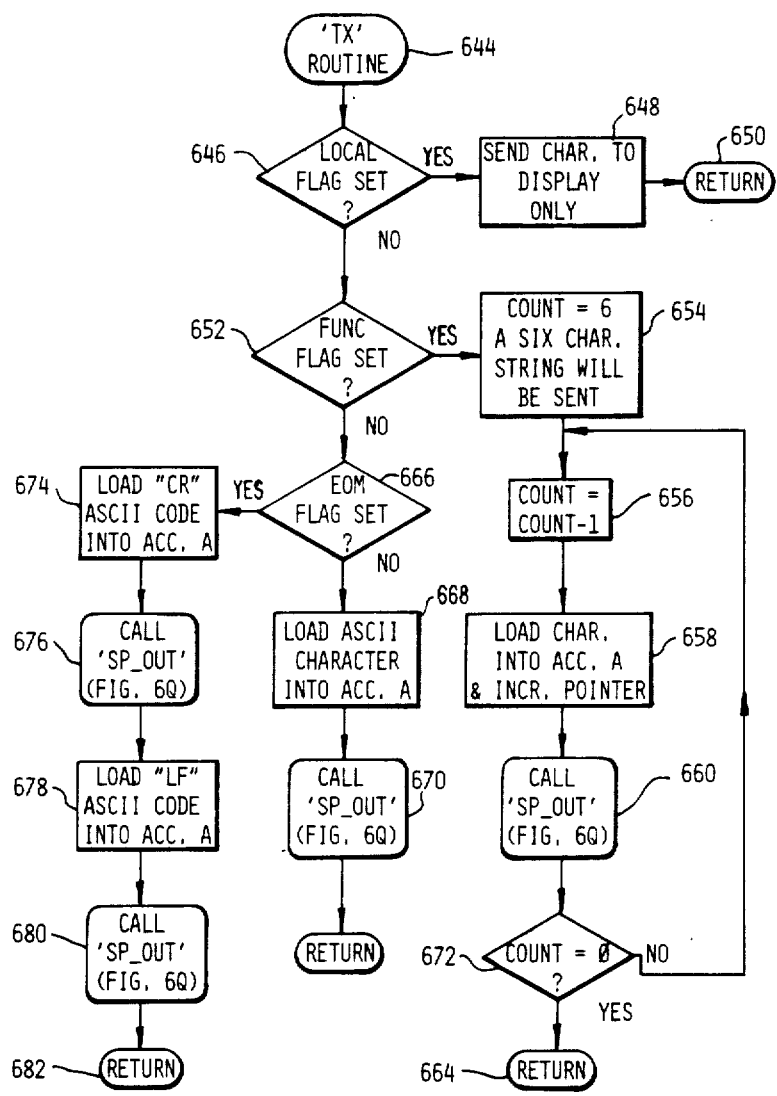

After a particular key on the keyboard is recognized and the transmit buffer is loaded, the transmit routine of FIG. 6P is called. The transmit routine first determines 646 whether the hand-held terminal is in the local or line mode and if in the local mode, the character is only sent 648 to the display. When the mode is the line mode a determination 652 is made concerning whether the function flag is set. If the function flag is set the character string count is set 654 to six and each character is individually loaded 658 into the accumulator, the pointer is incremented and the serial port out routine 660 is called. If the function string is of different length a different string count would be loaded. When the function flag is not set, a determination 666 is made concerning the end of message flag. If the end of message flag is not set, the ASCII character is loaded 668 into the accumulator and the serial port out routine is called 670. If the end of message flag is set, a carriage return code is loaded 674 into the accumulator, the serial port out routine is called 676, a line feed code is loaded 678 into the accumulator and the serial port out routine is again called 680.

Figure 6Q:
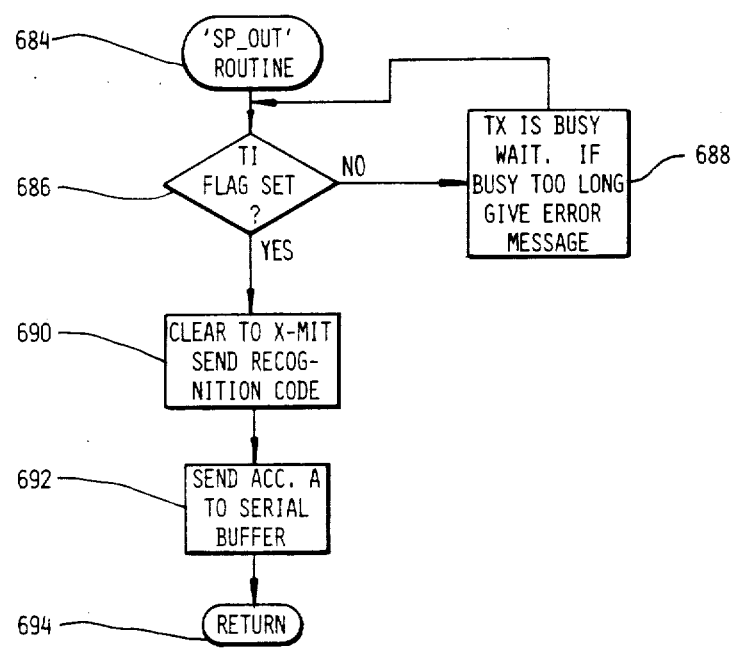

The serial port out routine of FIG. 6Q sends the character in the accumulator the transmit modulator 146 by loading the character into a serial buffer. First, the routine determines 686 whether the transmit interrupt flag is set. If the flag is not set, the transmitter is busy requiring a wait 688. If the wait is too long an error message should be produced. If it is clear to transmit the serial output buffer receives 690 the recognition code and the content of the accumulator is also sent 692 to the serial output buffer.

Figure 6R:
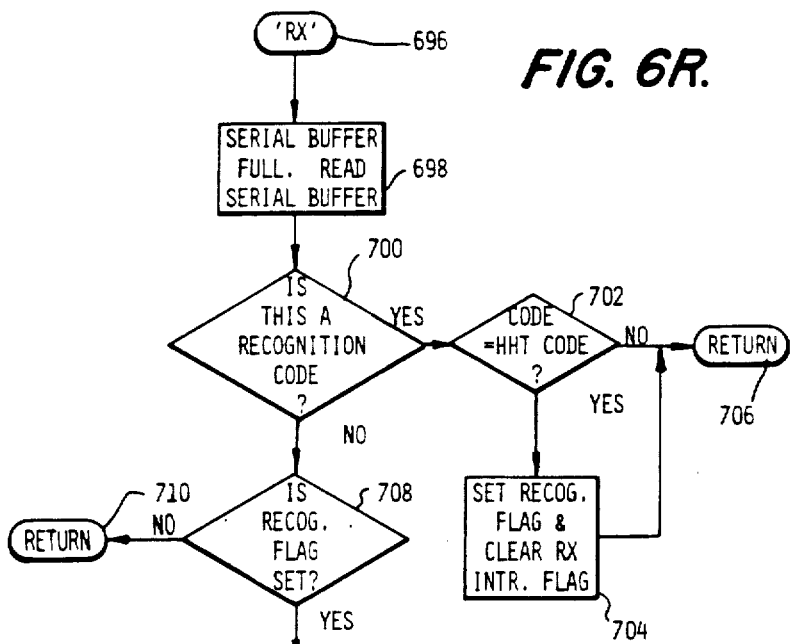

As can been seen from the above discussion, if the hand-held terminal 104 is in the line mode, a character is sent to the computer end terminal 100 without displaying the character on display 156. Whenever a character is sent to the computer end terminal 100, the character along with the recognition security code, is echoed back to the hand-held terminal 104. The received character code and security code cause a receive interrupt service routine as illustrated in FIG. 6R to be executed. The receive interrupt service routine will also be executed whenever a message from the computer end terminal 100 is transmitted to the hand-held terminal 104. When the serial buffer is full, it is read 698 and a determination 700 is made concerning whether the security or recognition code is the proper security code. If the code is correct 702, a recognition flag is set 704 and the receiver interrupt flag is cleared. If the security code is not the correct code, the hand-held terminal ignores the message 706. When the content of the serial buffer is not a recognition code, a determination 708 is made concerning whether the recognition flag has been set. If the recognition flag has been set, the data is valid and it is stored 712 in the receive buffer and sent to the display. The recognition and interrupt flags are then cleared 714.

Figure 7A:
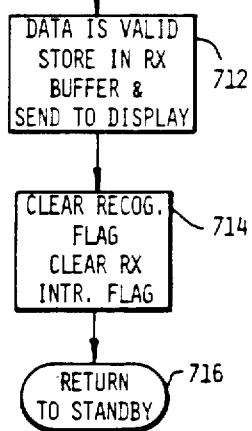
FIGS. 7A–7E are flowcharts of the program for the master microcomputer 206 in the computer interface transceiver of FIG. 3.

The computer end transceiver 100 includes both a master microcomputer 206 and a slave microcomputer 224 which share the same memory 218. Whenever the computer end terminal 100 is initialized, the mastercomputer 206 starts serial and parallel port initialization 802 and 804, and loads 806 the interrupt schedule set up occurs as illustrated in FIG. 7A. During the transmit and receive buffer clear stage 808 of the initialization routine, the status indication light emitting diodes 232 are cleared. The master them awaits an interrupt 810.

Figure 7B:
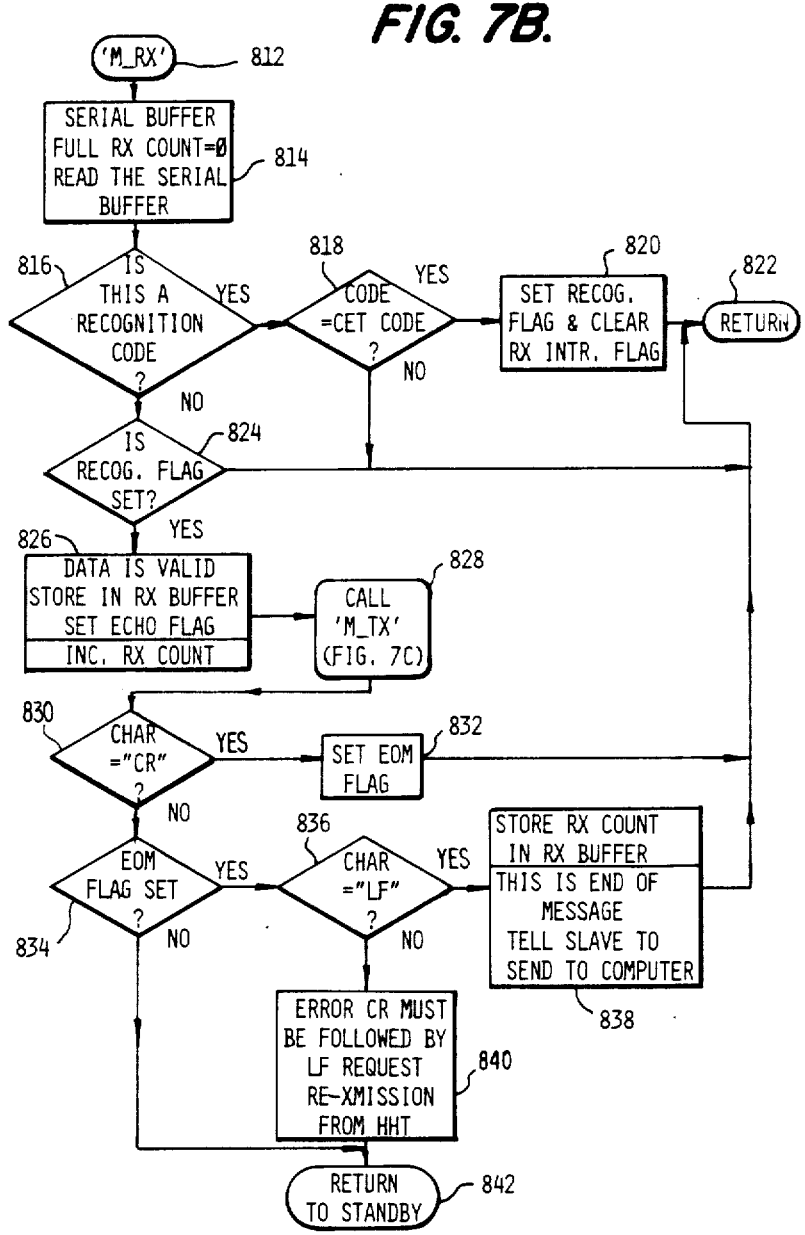

Whenever the serial buffer in the master 206 which receives messages from the hand-held terminal 102 is full, an interrupt occurs in the master microcomputer 206 and the master receive interrupt service routine of FIG. 7B is executed. When the serial buffer is full, a count is initialized 814 and the serial buffer is read. If the character is a security recognition code, a determination 818 is made concerning whether the code is the proper security code and if so, the recognition flag is set 820 and the receive interrupt flag is cleared. If it is not the recognition code, a determination 824 is made concerning whether the recognition flag has been set which indicates that a previous recognition code has been received. If the recognition flag is not set, the message is ignored 822. If the recognition flag is set, the data is valid, the data is stored in the receive buffer, the echo flag is set and the receive character count is incremented. Once the count is incremented, the master transmit routine is called 828. Next, a determination 830 is made concerning whether the received character is a carriage return code in which case the end of message flag is set 832. If the end of message flag is set 834, the character is examined 836 to determine if it is a line feed code. If the character is a line feed code, the receive count is stored 838 in the receive buffer and the slave is activated to send the message to the computer. If the end of message flag is set and the character is not a line feed code, an error has occurred and a request for retransmission is sent 840 to the hand-held terminal.

Figure 7C:
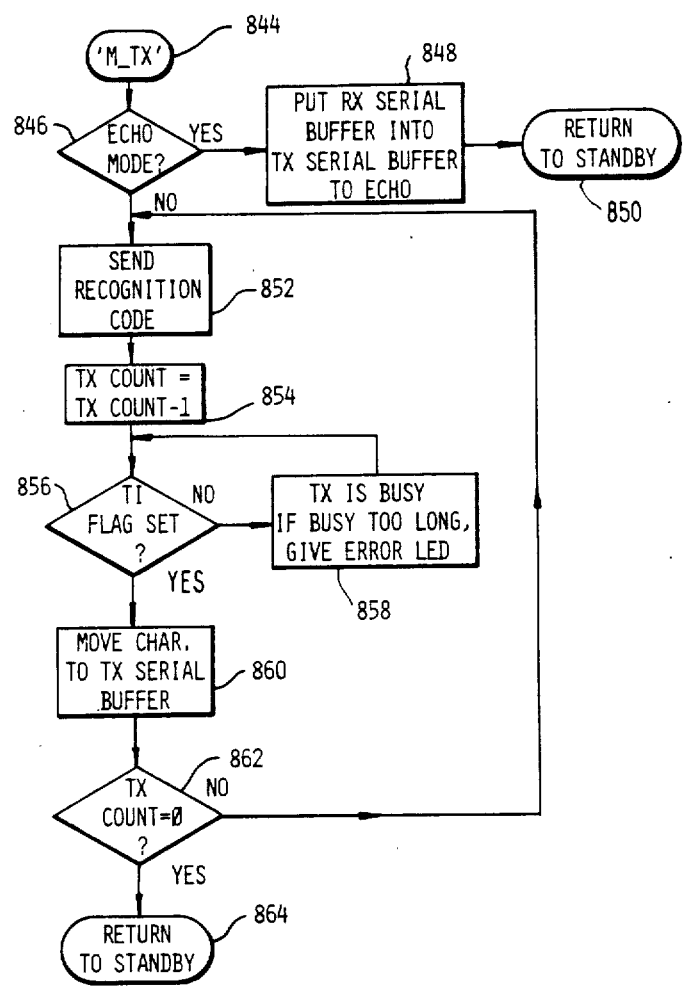

The master transmit routine of FIG. 7C transmits any character in the transmit buffer to the hand-held terminal. The master transmit routine determines 846 whether it is in the echo mode and, if so, the character is put into the serial transmit buffer and thereby sent to the hand-held terminal 104. If the mode is not the echo mode, indicating that a message from the computer is being sent, the recognition code is first sent 852 and the transmit count is decremented 854. Next, the transmit interrupt flag is examined 856 and if it is not set, the transmitter is busy requiring that an indicating error light emitting diode be activated 858 if the busy occurs for too long a period of time. If the transmit interrupt flag is set, the character is moved 860 to the serial transmit buffer and sent to the hand-held terminal 104 after which the transmit character count 862 is examined to determine if move characters need to be sent.

Figure 7D:
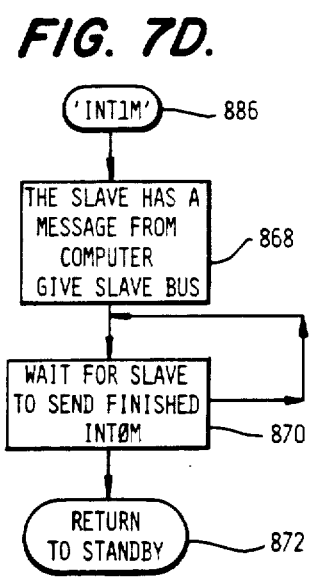
Figure 7E:
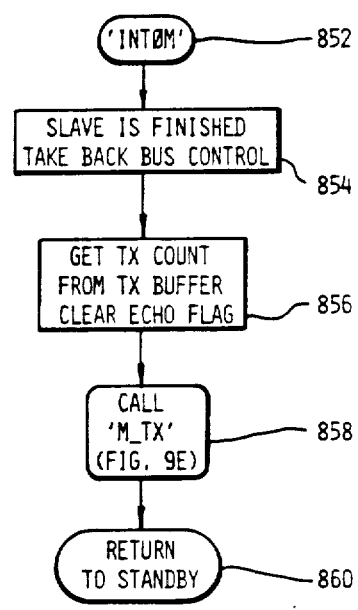

Whenever the slave microcomputer 224 has a message from the host computer 102, the slave 224 sends an interrupt to the master 206 and the interrupt service routine of FIG. 7D is executed. In this routine the slave is given 868 access to the common bus to allow storage of the message in common memory 218 and the master waits 870 for the slave to provide a second interrupt indicating the message is stored. The second interrupt is processed by the routine of FIG. 7E. During this routine the master takes back control of the bus, gets 856 the transmit count from the transmit buffer, clears the echo flag and calls 958 the master transmit routine.

Figure 8A:
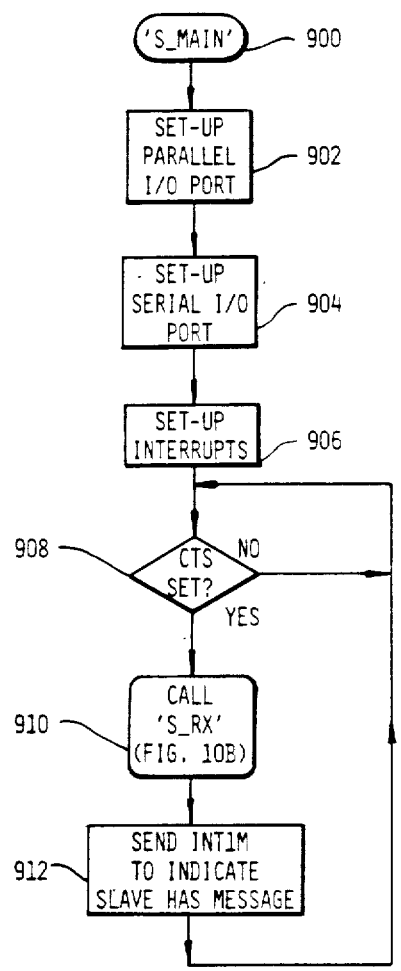
FIGS. 8A–8D are flowcharts for the slave microcomputer 224 in the computer end transceiver of FIG. 3.

The slave main routine of FIG. 8A performs initialization and set up procedures 902–906 similar to the previous microprocessor. The main routine for the slave then determines 908 whether it is clear to send and, if so, calls 910 the slave receive subroutine after which an interrupt is sent 912 to the master which indicates that the slave has a message.

Figure 8C:
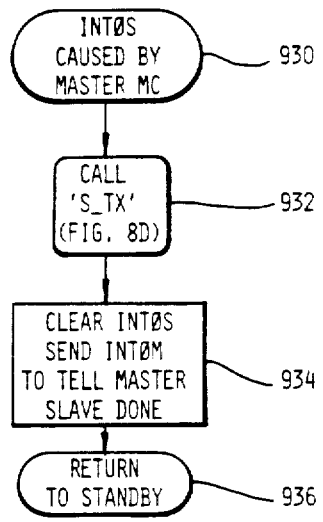
Figure 8B:
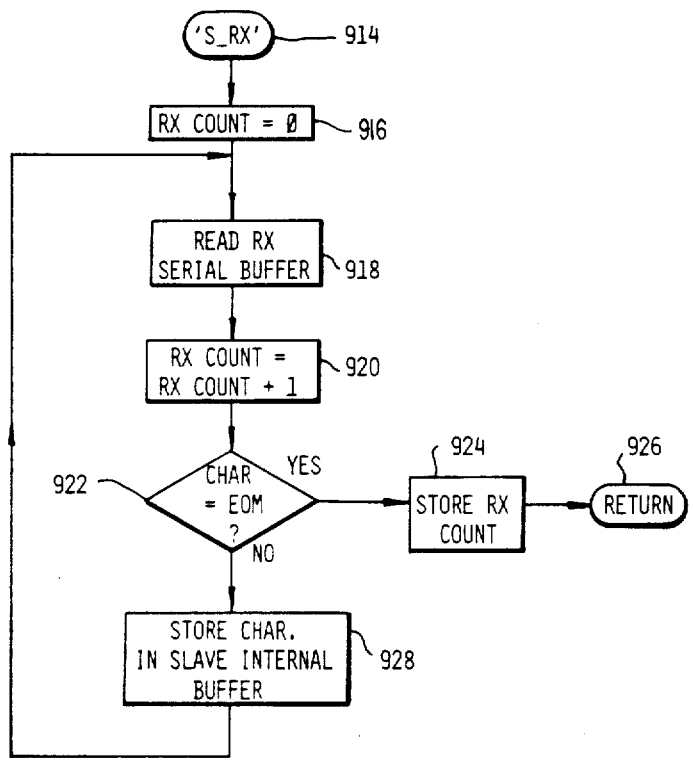

The slave receive routine of FIG. 8B initializes 916 a receive count of zero and then reads 918 the serial buffer connected to the host computer 100. The count is incremented 920 and a determination 922 is made as to whether the received character is an end of message character. If it is the end of message, the receive count is stored 924 in the receive buffer. If it is not the end of message, the character is stored in a slave 224 internal buffer.

Whenever an interrupt caused by the master occurs, the interrupt service routine of FIG. 8C calls 932 the slave transmit routine, after which it clears 934 the slave interrupt and interrupts the master, indicating that the transmit is completed.

Figure 8D:
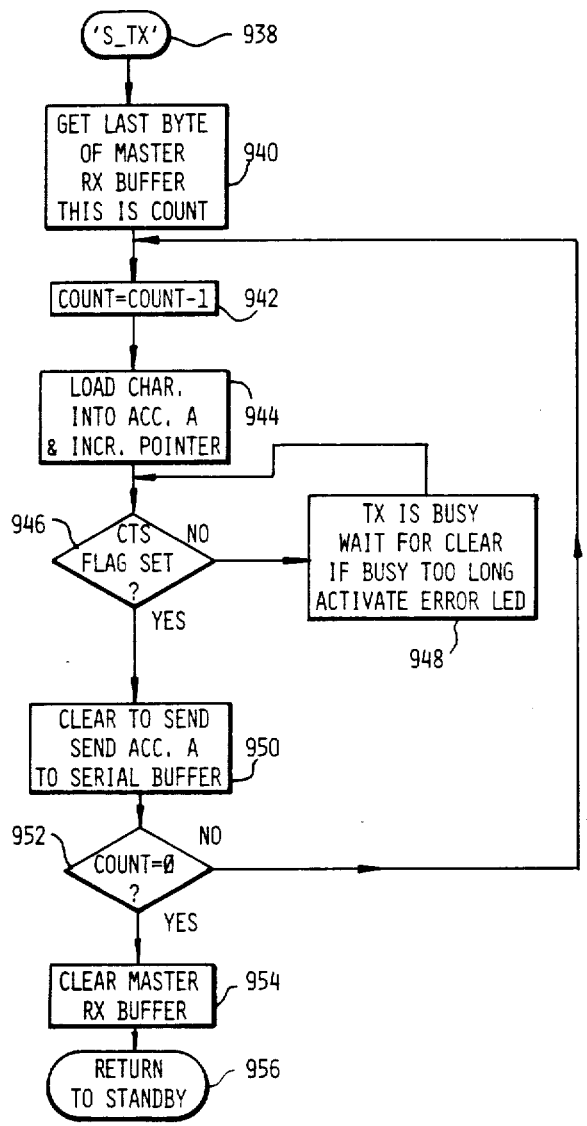

The slave transmit routine of FIG. 8D retrieves 940 the character count from the receive buffer and decrements 942 the count. After the count is decremented the character is loaded 944 into the accumulator and the pointer to the master receive buffer is incremented. If the clear to send flag is not set 946, once again, a wait occurs 948 or an error message is provided. When it is clear to send the contents of the accumulator is sent 950 to the serial buffer which automatically sends the character to the host computer 102. After the character is sent, the count is examined to determine if any characters are left and, if so, the routine continues to send to characters. If the count is zero, the master receive buffer is cleared. In the previous discussions error messages produced by the hand-held terminal 104, are output to the display 156. It is possible to blink these messages as well as messages from the host computer. As an alternative, a blinking light or tone could be produced, however, such features would add to the power consumption of the terminal. The discussion of message passing has focused on sending any message one character at a time, however, it is possible to send and receive plural character message strings by using a message counter in the hand-held terminal 104. It is also possible to mask interrupts in all processors so that interrupt processing does not itself get interrupted. It is further possible to provide a transmit-self test in both the hand-held terminal 104 and the computer end transceiver 102 by causing the modulators and demodulators to loop back the character code using jumper pins (not shown) at the output of the modulator send input of the demodulators. This feature, in the hand-held terminal 104, would require opening the case and could be added by one of ordinary skill in the art.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A wireless hand-held computer controller system for a host computer, comprising:
 a hand-held terminal including:
  a keyboard for entering a key code;
  first processing means for converting the key code into a character code, outputting the character code, receiving both a character code echo and a returned security code and determining whether the returned security code is correct;

first security code means for producing a security code;

first wireless transmit/receive means for wirelessly transmitting the output character code and the security code together, and receiving the character code echo and the returned security code; and display means for displaying the character code echo when the returned security code is correct; and a computer end transceiver including:

second wireless transmit/receive means for wirelessly receiving the character code and the security code, and always transmitting, when produced, both the character code echo and the returned security code; and second processing means for receiving the character code and the security code, and, when the security code is correct, always producing both the character code echo and the returned security code and transmitting the character code to the host computer.

2. A system as recited in claim 1, wherein when the host computer sends a message to said second processing means, said second processing means, through said second and first wireless transmit/receive means, sends the message to said first processing means and said first processing means displays the message on said display means.

3. A system as recited in claim 1, wherein said first processing means comprises:

a microprocessor; and a memory connected to said microprocessor and both having a power down mode.

4. A system as recited in claim 3, wherein the microprocessor is interrupt driven and awaits an interrupt in the power down mode.

5. A system as recited in claim 4, further comprising a common bus connected to said memory and said microprocessor, and used as both a data bus and an address bus.

6. A system as recited in claim 5, wherein said memory includes:

a read only memory, connected to said common bus, for storing a control program and a key/character code translation table, and having a low power standby mode controllable by said microprocessor; and a random access memory, connected to said common bus, having a low power mode controllable by said microprocessor and including transmit and receive buffers areas.

7. A system as recited in claim 1, wherein said keyboard includes two shift keys and N character keys where N is an integer, said first processing means converting a character key depression into one of three character codes in dependence upon the depression of one of said shift keys.

8. A wireless hand-held computer controller system for a host computer, comprising:

a hand-held terminal including:

a keyboard for entering a key code;

first processing means for converting the key code into a character code, outputting the character code and receiving character code echo;

first wireless transmit/receive means for wirelessly transmitting the output character code and receiving the character code echo; and display means for displaying the character code echo; and a computer end transceiver including:

second wireless transmit/receive means for wirelessly receiving the character code and transmitting the character code echo; and second processing means for receiving the character code, returning the character code echo and transmitting the character code to the host computer, said second processing means comprising:

a master microcomputer receiving and storing the character codes and producing the character code echo; and a common memory connected to said master microprocessor for storing the character code; and a slave microcomputer, connected to said common memory and the host computer, for retrieving the character code from said common memory and sending the character code to the computer.

9. A system as recited in claim 8, further comprising a common bus connected to said common memory and said master and slave microprocessors, said common bus used as both an address and data bus.

10. A system as recited in claim 8, wherein said second processing means includes:

master status means for visually indicating transmission and reception status between said hand-held terminal and said computer end transceiver; and slave status means for visually indicating transmission and reception status between said computer end transceiver and the host computer.

11. A system as recited in claim 8, wherein said master and slave microcomputers obtain access to said common memory by interrupt hand shaking.

12. A wireless hand-held computer controller system for a light water nuclear power plant simulator host computer, comprising:

a hand-held terminal including:

a keyboard having multiple function keys and shift keys for entering a key code;

first processing means for converting the key code into a character code and receiving a returned security code and a character code echo and having a program and data memory accessed over a common address and data bus and having a low power consumption mode; and first wireless transmit/receive means for wirelessly transmitting the output character and a security code together and receiving both the character code echo and the returned security code; and a computer and transceiver including:

second wireless transmit/receive means for wirelessly receiving the security and character code and always transmitting, when produced, both the returned security code and character code echo; and second processing means for checking the security code, and always propducing both the returned security code and the character code echo and transferring the character code echo to the host computer if the security code is correct, and said first processing means displaying the character code echo when the returned security code is correct.

13. A system as recited in claim 12, wherein when the host computer sends a message to said second processing means, said second processing means, through said second and first wireless transmit/receive means, sends the message to said first processing means and said first processing means displays the message on said display means.

14. A system as recited in claim 12, wherein said keyboard includes two shift keys and N character keys where N is an integer, said first processing means converting a character key depression into one of three character codes in dependence upon the depression of one of said shift keys.

15. A system as recited in claim 12, wherein said second processing means includes:
- master status means for indicating transmission and reception status between said hand-held terminal and said computer end transceiver;
- slave status means for indicating transmission and reception status between said computer end transceiver and the computer.

* * * * *